(12) United States Patent
Lee

(10) Patent No.: US 8,060,132 B2
(45) Date of Patent: Nov. 15, 2011

(54) APPARATUS AND METHOD FOR A REPEATER USING A MULTI-ANTENNA IN A WIRELESS COMMUNICATION SYSTEM

(75) Inventor: Jun-Sung Lee, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 990 days.

(21) Appl. No.: 11/965,960

(22) Filed: Dec. 28, 2007

(65) Prior Publication Data

US 2008/0159200 A1 Jul. 3, 2008

(30) Foreign Application Priority Data

Dec. 28, 2006 (KR) ........................ 10-2006-0136282

(51) Int. Cl.
*H04B 1/034* (2006.01)
(52) U.S. Cl. ...................... 455/550.1; 455/130; 375/267
(58) Field of Classification Search ................. 455/550.1
See application file for complete search history.

(56) References Cited

U.S. PATENT DOCUMENTS

2006/0150219 A1* 7/2006 Lee et al. ........................ 725/69

FOREIGN PATENT DOCUMENTS

KR 10-2006-0054398 A 5/2006

* cited by examiner

*Primary Examiner* — Duc Nguyen
*Assistant Examiner* — Ajibola Akinyemi
(74) *Attorney, Agent, or Firm* — Jefferson IP Law, LLP

(57) ABSTRACT

An apparatus and a method for supporting a relay service using at least two antennas in a wireless communication system are provided. The apparatus includes at least two antennas, each of the at least two antennas for receiving a signal, at least two factor generators, each of the at least two factor generators for generating a factor used for removing at least one polarization component other than a select polarization component from a signal, at least two filters, each of the at least two filters for filtering at least one polarization component other than a select polarization component from the signal received by one of the at least two antennas using a factor generated by one of the at least two factor generators, and at least two signal detectors, each of the at least two signal detectors for detecting a signal for the select polarization component filtered by one of the at least two filters.

19 Claims, 4 Drawing Sheets

APPARATUS AND METHOD FOR A REPEATER USING A MULTI-ANTENNA IN A WIRELESS COMMUNICATION SYSTEM

PRIORITY

This application claims the benefit under 35 U.S.C. §119(a) of a Korean patent application filed in the Korean Intellectual Property Office on Dec. 28, 2006 and assigned Ser. No. 2006-136282, the entire disclosure of which is hereby incorporated by reference.

BACKGROUND OF THE INVENTION

1. Field of the Invention

The present invention relates generally to an apparatus and a method for a repeater in a wireless communication system. More particularly, the present invention relates to an apparatus and a method for a repeater using a multi-antenna in a wireless communication system.

2. Description of the Related Art

As the wireless communications market has grown, wireless communication systems have evolved to provide multimedia services. When providing multimedia services, wireless communication systems transmit large amounts of data at a high data rate. In an effort to more efficiently utilize the limited frequency resources, a multi-antenna scheme (e.g., Multiple Input Multiple Output (MIMO)) is being developed.

Using a multi-antenna, a wireless communication system sends signals by occupying channels so as to be able to extract the independent signals through the multi-antenna.

Wireless communication systems may have one or more shadow areas. A shadow area is an area where the sensitivity of radio waves is weakened or the propagation of radio waves is limited. The shadow area may be caused by high buildings, entangled roads or the like. If a terminal serviced by a base station travels into a shadow area, the terminal cannot provide normal service because of the low power level of the signal received from the base station. To address the shadow area, the wireless communication system may utilize a repeater.

A repeater amplifies the signal received from the base station and retransmits the amplified signal to terminals in the shadow areas so that the terminals can receive the signal with a sufficient level of power. The repeater also amplifies signals received from the terminals in the shadow area and retransmits the amplified signals to the base station so that the base station can acquire the signals from the terminals.

A conventional repeater is constructed as shown in FIG. 1.

FIG. 1 is a block diagram of a conventional repeater using a single antenna for communications with the terminals and another single antenna for communications with the base station. Hereafter, an exemplary Radio Frequency (RF) repeater is explained.

When receiving a signal from a base station 100 over a first antenna 120, the repeater 110 of FIG. 1 amplifies the received signal using a first amplifier 113. The repeater 110 transmits the amplified signal to terminals over a second antenna 130.

When receiving a signal from the terminals over the second antenna 130, the repeater 110 amplifies the received signal using a second amplifier 114. The repeater 110 transmits the amplified signal to the base station 100 over the first antenna 120.

The repeater 110 interconnects the antennas 120 and 130 and the amplifiers 113 and 114 using switches 111 and 115. For example, when the repeater 110 relays the signal of the base station 100, the first switch 111 connects the first antenna 120 to the first amplifier 113 and the second switch 115 connects the second antenna 130 to the first amplifier 113. When the repeater 110 relays the signal of the terminals, the first switch 111 connects the first antenna 120 to the second amplifier 114 and the second switch 115 connects the second antenna 130 to the second amplifier 114.

As discussed above, a wireless communication system may employ a repeater to address a shadow area. When implemented, the repeater relays the signals using a single antenna for communications with the terminals and another single antenna for communications with the base station. However, even when the wireless communication system adopts a multi-antenna scheme to increase the capacity and the data rate, the signal relayed by the repeater cannot increase the data capacity because the repeater still uses a single antenna for communications with the terminals and another single antenna for communications with the base station.

SUMMARY OF THE INVENTION

An aspect of the present invention is to address at least the above problems and/or disadvantages and to provide at least the advantages described below. Accordingly, an aspect of the present invention is to provide an apparatus and a method for supporting a relay service using a multi-antenna in a wireless communication system.

Another aspect of the present invention is to provide an apparatus and a method for a repeater using a multi-antenna in a wireless communication system, which detects and relays a signal received on the multi-antenna using an orthogonality of a longitudinal wave and a transverse wave.

The above aspects are achieved by providing a repeater apparatus in a wireless communication system. The repeater apparatus includes at least two antennas, each of the at least two antennas for receiving a signal, at least two factor generators, each of the at least two factor generators for generating a factor used for removing at least one polarization component other than a select polarization component from a signal, at least two filters, each of the at least two filters for filtering at least one polarization component other than a select polarization component from the signal received by one of the at least two antennas using a factor generated by one of the at least two factor generators, and at least two signal detectors, each of the at least two signal detectors for detecting a signal for the select polarization component filtered by one of the at least two filters.

According to one aspect of the present invention, a method for relaying a signal at a repeater of a wireless communication system includes generating a factor used for removing at least one polarization component other than a select polarization component from signals received on at least two antennas, filtering out the at least one polarization component other than the select polarization component from the signals received on at least two antennas using the generated factor, and detecting the signal for the filtered select polarization component.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description when taken in conjunction with the accompanying drawings, in which.

Throughout the drawings, it should be noted that like reference numerals will be understood to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a technique for supporting a relay service using a multi-antenna in a wireless communication system. In particular, a repeater including a multi-antenna detects a signal received by the multi-antenna and relays the signal based on the orthogonality of a transverse wave and a longitudinal wave in the wireless communication system.

In the following descriptions, a base station transmits a signal using a dual polarization antenna so that the multi-antenna of the repeater can detect the signal received on the antennas based on the orthogonality of the transverse wave and the longitudinal wave. The base station is constituted as shown in FIG. 2.

Figure 1:
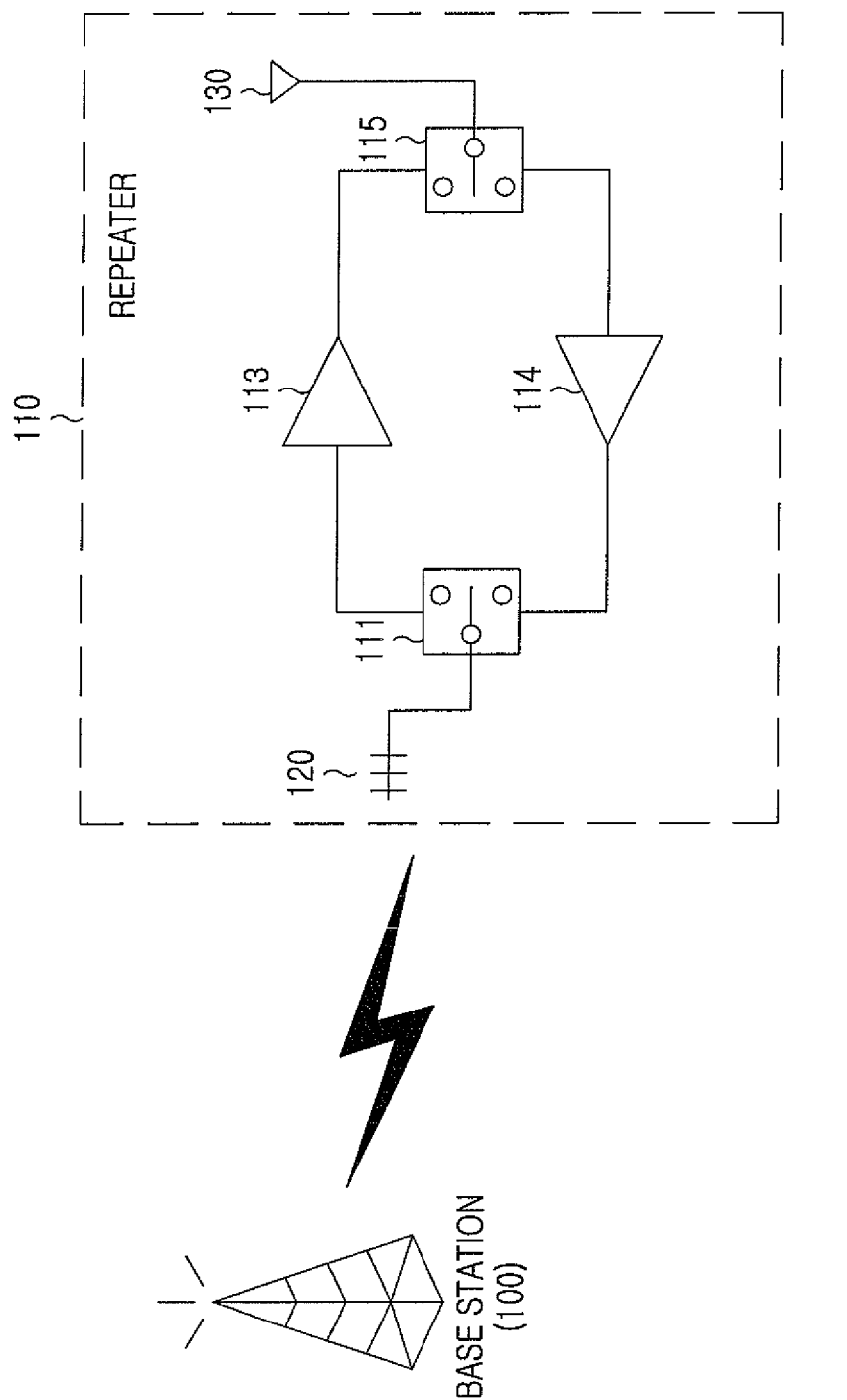
FIG. 1 is a block diagram of a conventional RF repeater using a single antenna for communications with terminals and another single antenna for communications with a base station.
Figure 2:
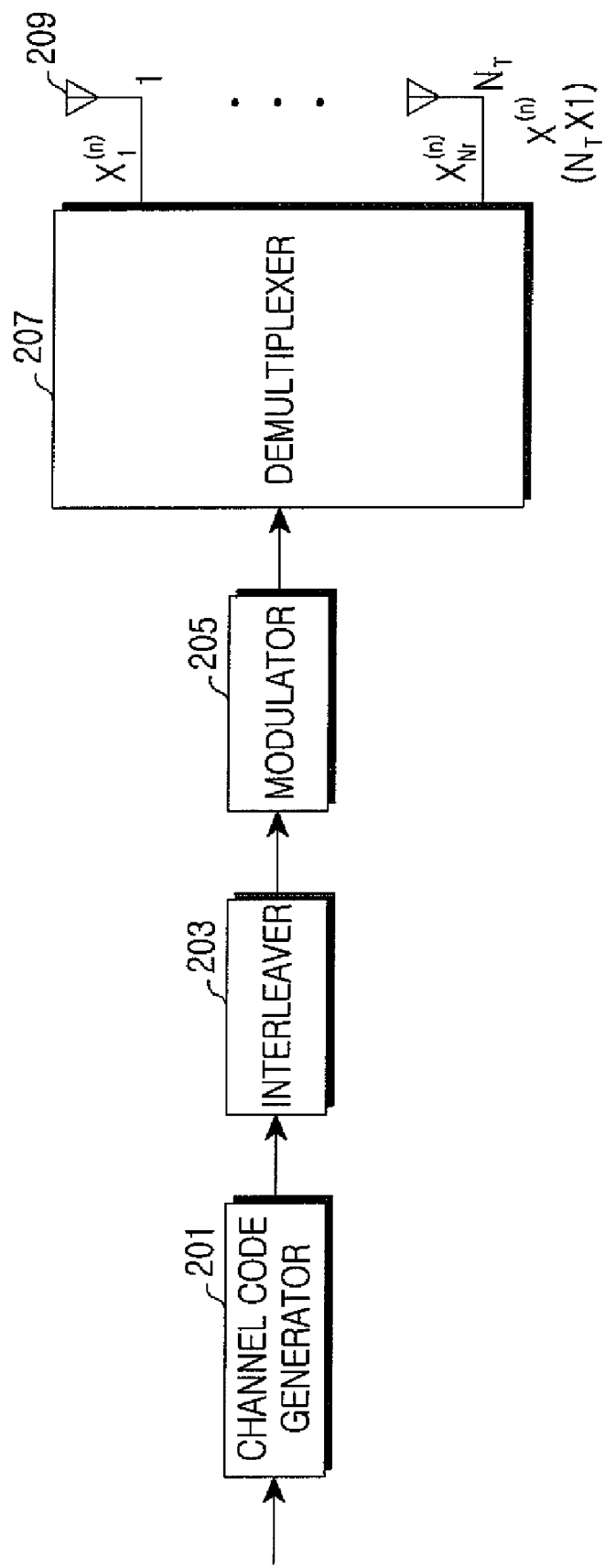
FIG. 2 is a block diagram of a base station using a dual polarization antenna according to an exemplary embodiment of the present invention.

FIG. 2 is a block diagram of a base station including a dual polarization antenna according to an exemplary embodiment of the present invention.

The base station of FIG. 2 includes a channel code generator 201, an interleaver 203, a modulator 205, a demultiplexer 207, and a plurality of dual polarization antennas 209.

The channel code generator 201 codes an information bit stream to transmit at a given coding rate and outputs coded symbols. For example, the channel code generator 201 can be implemented using a convolutional encoder, a turbo encoder, a Low Density Parity Check (LDPC) encoder, and so forth.

The interleaver 203 interleaves the symbols provided from the channel code generator 201 according to a preset rule to make the symbols robust to a burst error.

The modulator 205 modulates the interleaved symbols provided from the interleaver 203 using a corresponding modulation scheme. In particular, the modulator 205 outputs a complex signal by signal-point mapping the symbols fed from the interleaver 203 to a constellation according to the corresponding modulation scheme. For instance, the modulation scheme includes a Binary Phase Shift Keying (BPSK) which maps one bit (s=1) to one complex signal, a Quadrature Phase Shift Keying (QPSK) which maps two bits (s=2) to one complex signal, a 8-ary Quadrature Amplitude Modulation (8QAM) which maps three bits (s=3) to one complex signal, and a 16 QAM which maps four bits (s=4) to one complex signal.

The demultiplexer 207 separates and outputs the signals to the respective antennas by demultiplexing the complex signals provided from the modulator 205.

The antennas 209 transmit the signals output from the demultiplexer 207 on a transverse wave or a longitudinal wave. For example, when the base station employs two antennas, the signal is carried on the transverse wave of the first antenna and the signal is carried on the longitudinal wave of the second antenna. Alternatively, the base station can transmit the signals using both the transverse wave and the longitudinal wave from the antennas.

Hereafter, a repeater which relays a signal between the base station and a terminal in the wireless communication system will be described.

Figure 3:
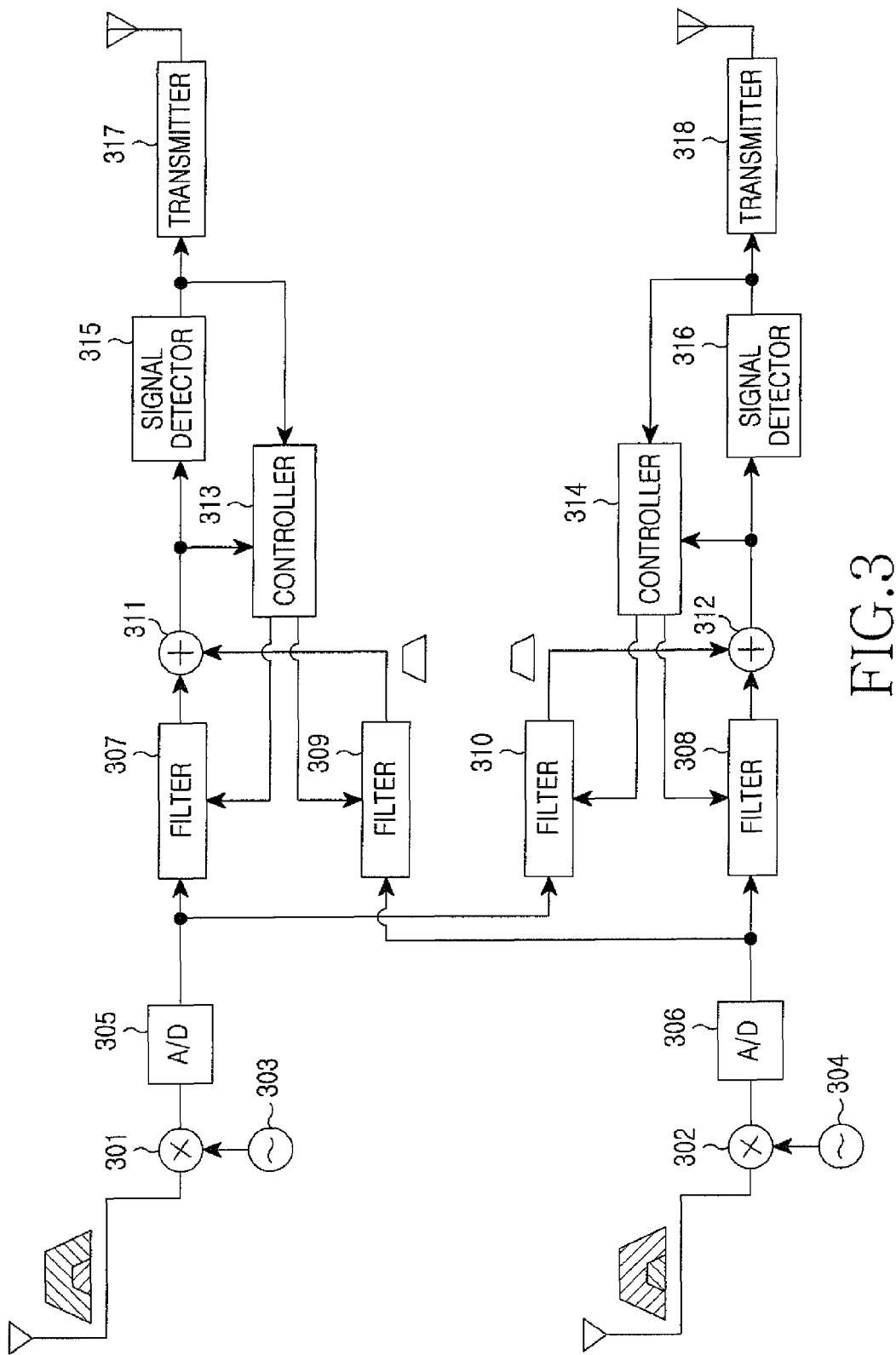
FIG. 3 is a block diagram of a repeater using a multi-antenna according to an exemplary embodiment of the present invention.

FIG. 3 is a block diagram of a repeater including a multi-antenna according to an exemplary embodiment of the present invention. The repeater illustrated in FIG. 3 includes two pairs of antennas, one pair of antennas for receiving and the other pair of antennas for transmitting. It is assumed that one antenna of each of the pairs of transmitting antennas transceives only a signal of a transverse wave component and the second antenna of each of the pairs of antennas transceives only a signal of a longitudinal wave component. However, as would be appreciated by one of ordinary skill in the art, the repeater may use a single pair of antennas with one of the antennas being used for reception and also the transmission of a signal of a transverse wave component and the second of the antennas being used for reception and also the transmission of a signal of a longitudinal wave component. Furthermore, in another exemplary embodiment the same antenna may be used to transmit a signal of a transverse wave component and a signal of a longitudinal wave component.

The repeater of FIG. 3 includes, multipliers 301 and 302, local oscillators 303 and 304, Analog/Digital Converters (ADCs) 305 and 306, filters 307 through 310, adders 311 and 312, controllers 313 and 314, signal detectors 315 and 316, transmitters 317 and 318 and a plurality of the transceiver antennas. Hereafter, the antennas connected to multiplier 301 and transmitter 317 will collectively be referred to as the first transceiver antenna and the antennas connected to multiplier 302 and transmitter 318 will collectively be referred to as the second transceiver antenna.

The multipliers 301 and 302 convert a Radio Frequency (RF) signal received on the first and second antennas into a baseband signal by multiplying the RF signal by a center frequency provided from the local oscillators 303 and 304.

The local oscillators 303 and 304 generate the center frequency to convert the RF signal into the baseband signal.

The ADCs 305 and 306 convert the analog signal provided from the multipliers 301 and 303 into a digital signal.

The first filter 307 filters the longitudinal wave component from the signal output from the first ADC 305. More specifically, the first filter 307 passes only the transverse wave component by filtering the longitudinal wave component from the signal received by the first receiver antenna. The first filter 307 filters the longitudinal wave component based on a first reference signal provided from the first controller 313. Herein, the first reference signal is a first projection factor generated at the first controller 313.

The second filter 308 filters the transverse wave component from the signal output from the second ADC 306. More specifically, the second filter 308 passes only the longitudinal wave component by filtering the transverse wave component from the signal received by the second receiver antenna. The second filter 308 filters the transverse wave component based on a second reference signal provided from the second controller 314. Herein, the second reference signal is a second projection factor generated at the second controller 314.

The third filter 309 filters the longitudinal wave component from the signal output from the second ADC 306 so that it may be added to the transverse wave component passed through the first filter 307. The third filter 309 passes only the transverse wave component by filtering the longitudinal wave component in the signal received on the second receiver antenna using the first projection factor provided from the first controller 313.

The fourth filter 310 filters the transverse wave component in the signal output from the first ADC 305 so that it may be added to the longitudinal wave component passed through the second filter 308. The fourth filter 310 passes only the longitudinal wave component by filtering the transverse wave component in the signal received on the first receiver antenna using the second projection factor provided from the second controller 314.

The first controller 313 generates the first projection factor for removing the longitudinal wave component from the signal received on the first receiver antenna. The first projection factor may be a first projection matrix. The first controller 313 calculates the first projection factor by applying the transverse wave signal output from the first adder 311 and the transverse wave component output from the first signal detector 315 to Equation (1).

$$P = a\left(\frac{a^T b}{a^T a}\right) \quad (1)$$

In Equation (1), P denotes the projection factor, a denotes the transverse wave component, and b denotes the longitudinal wave component.

As expressed in Equation (1), the first projection factor makes the longitudinal wave component orthogonal to the transverse wave component. Since the longitudinal wave component is made orthogonal to the transverse wave component based on the first projection factor generated at the first controller 313, the first filter 307 and the third filter 309 can filter the longitudinal wave component using the first projection factor.

The second controller 314 generates the second projection factor to remove the transverse wave component from the signal received on the second receiver antenna. The second projection factor may be a second projection matrix. The second controller 314 calculates the second projection factor by applying the longitudinal wave signal output from the second adder 312 and the longitudinal wave component output from the second signal detector 316 to Equation (2).

$$P = b\left(\frac{b^T a}{b^T b}\right) \quad (2)$$

In Equation (2), P denotes the projection factor, a denotes the transverse wave component, and b denotes the longitudinal wave component.

As expressed in Equation (2), the second projection factor projects the transverse wave component to be orthogonal to the longitudinal wave component. Since the transverse wave component is projected to be orthogonal to the longitudinal wave component based on the second projection factor generated at the second controller 314, the second filter 308 and the fourth filter 310 can filter the transverse wave component using the second projection factor.

The first adder 311 adds the transverse wave component output from the first filter 307 and the transverse wave component output from the third filter 309 to increase the transverse wave component.

The second adder 312 adds the longitudinal wave component output from the second filter 308 and the longitudinal wave component output from the fourth filter 310 to increase the longitudinal wave component.

The first signal detector 315 detects the signal using the transverse wave component provided from the first adder 311.

The second signal detector 316 detects the signal using the longitudinal wave component provided from the second adder 312.

The first transmitter 317 amplifies the power of the signal with respect to the transverse wave component, which is detected at the first signal detector 315, and transmits the amplified signal via the first transceiver antenna. The second transmitter 318 amplifies the power of the signal with respect to the longitudinal wave component, which is detected at the second signal detector 316, and transmits the amplified signal via the second transceiver antenna.

Hereafter, a method will be described for a repeater of the wireless communication system to detect and relay the received signal using the transverse wave component and the longitudinal wave component of the received signal. By way of example, the repeater relays the signal received from the base station to terminals. Note that the repeater operates the same when relaying signals received from the terminals to the base station.

Figure 4:
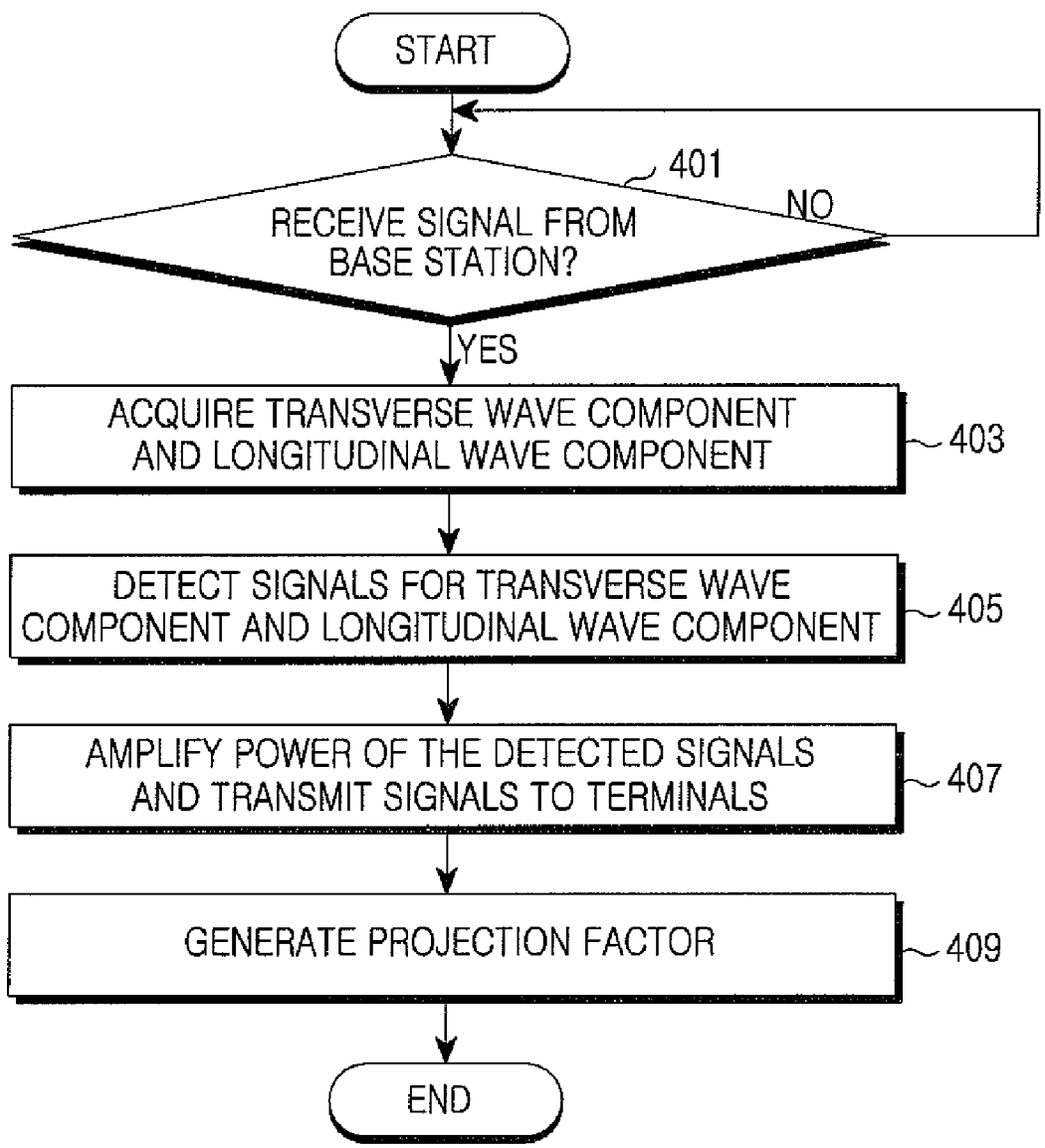
FIG. 4 is a flowchart of a relay service supporting method using the multi-antenna according to an exemplary embodiment of the present invention.

FIG. 4 is a flowchart of a relay service supporting method using the multi-antenna according to an exemplary embodiment of the present invention.

The repeater determines whether a signal is received from the base station via the respective antennas in step 401.

Upon receiving the signal, the repeater acquires the transverse wave component and the longitudinal wave component by filtering the signal received on the antennas in step 403. For example, when the repeater is constituted as shown in FIG. 3, the repeater obtains the transverse component by filtering out the longitudinal wave component of the signals received on the first receiver antenna and the second receiver antenna using the first projection factor generated at the first controller 313. The repeater obtains only the longitudinal wave component by filtering out the transverse wave component of the signals received on the first receiver antenna and the second receiver antenna using the second projection factor generated at the second controller 314.

In doing so, the repeater filters the received signals using the first and second projection factors of the previously received signal.

In step 405, the repeater detects signals for the acquired transverse wave component and longitudinal wave component. For example, the repeater detects the signal for the acquired transverse wave component using the first signal detector 315 of FIG. 3, and detects the signal for the acquired longitudinal wave component using the second signal detector 316 of FIG. 3.

Next, the repeater amplifies the power of the signals of the transverse wave component and the longitudinal wave component and transmits the signals to the terminals in step 407. For example, the repeater amplifies the power of the signal detected using the transverse wave component and transmits the amplified signal to the terminals through the first transmitter 317. The repeater amplifies the power of the signal detected using the longitudinal wave component and transmits the amplified signal to the terminals using the second transmitter 318.

In step 409, the repeater generates first and second projection factors using the acquired transverse and longitudinal wave components and the detected signals. The repeater generates the first and second projection factors to filter a next received signal. For example, the repeater generates the first projection factor to remove the transverse wave component from the received signal by applying the acquired transverse wave component and the signal detected using the longitudinal wave component to Equation (1). At this time, the transverse wave component is the summation of the transverse wave component of the signal received on the first receiver antenna and the transverse wave component of the signal received on the second receiver antenna.

The repeater generates the second projection factor to remove the longitudinal wave component from the received signal by applying the acquired longitudinal wave component and the signal detected using the longitudinal wave component to Equation (2). The longitudinal wave component is the summation of the longitudinal wave component of the signal received on the first receiver antenna and the longitudinal wave component of the signal received on the second receiver antenna.

Next, the repeater finishes this process.

In this embodiment of the present invention, the receiver antenna and the transmitter antenna are separated in the repeater. Alternatively, the repeater can share the transmitter antenna and the receiver antenna using a single antenna.

As set forth above, the repeater including the multi-antenna in the wireless communication system transceives signals by independently separating the signals using the transverse wave and the longitudinal wave. Thereby, the ability to transmit data in the shadow area is increased.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A repeater apparatus in a wireless communication system, comprising:
at least two antennas, each of the at least two antennas for receiving a signal;
at least two factor generators, each of the at least two factor generators for generating a factor used for removing at least one polarization component other than a select polarization component from a signal;
at least two filters, each of the at least two filters for filtering out at least one polarization component other than the select polarization component from the signal received by one of the at least two antennas using the factor generated by one of the at least two factor generators; and
at least two signal detectors, each of the at least two signal detectors for detecting a signal for the select polarization component filtered by one of the at least two filters.

2. The repeater apparatus of claim 1, wherein the at least one and select polarization components each comprise at least one of a transverse wave and a longitudinal wave.

3. The repeater apparatus of claim 1, wherein the at least two factor generators comprise:
a first factor generator for generating a first factor used to filter a longitudinal wave component by orthogonalizing the longitudinal wave component to the transverse wave component when a signal for the transverse wave component is detected using the signal received by a first of the at least two antennas; and
a second factor generator for generating a second factor to filter the transverse wave component by orthogonalizing the transverse wave component to the longitudinal wave component when the signal for the longitudinal wave component is detected using the signal received by a second of the at least two antennas.

4. The repeater apparatus of claim 3, wherein the at least two filters comprise:
a first filter for filtering out the longitudinal wave component from the signal received by the first antenna using the factor generated at the first factor generator when a signal for the transverse wave component is detected using the signal received by the first antenna; and
a second filter for filtering out the transverse wave component from the signal received by the second antenna using the factor generated at the second factor generator when a signal for the longitudinal wave component is detected using the signal received by the second antenna.

5. The repeater apparatus of claim 4, wherein the filters further comprise:
a third filter for filtering out the longitudinal wave component from the signal received by the second antenna using the factor generated at the first factor generator; and
a fourth filter for filtering out the transverse wave component from the signal received by the first antenna using the factor generated at the second factor generator,
wherein each of the at least two signal detectors detect a signal with respect to a summation of the transverse wave components output from the first filter and the third filter and detect a signal with respect to a summation of the longitudinal wave components output from the second filter and the fourth filter.

6. The repeater apparatus of claim 1, wherein each of the at least two factor generators generate the factor using the corresponding filtered select polarization component and the signal detected at the corresponding signal detector.

7. The repeater apparatus of claim 1, further comprising:
an amplifier for amplifying a power of the signal detected at each of the signal detectors; and
at least two transmitter antennas, each for transmitting the amplified signals.

8. The repeater apparatus of claim 7, wherein the antennas for receiving and the transmitter antennas are identical or different antennas.

9. The repeater apparatus of claim 1, wherein the at least two filters comprise:
a first filter for filtering out a longitudinal wave component from the signal received by a first of the at least two antennas using the factor generated at a first of the at least two factor generators when a signal for the transverse wave component is detected using the signal received by the first antenna; and
a second filter for filtering out a transverse wave component from the signal received by a second of the at least two antennas using the factor generated at a second of the at least two factor generators when a signal for the longitudinal wave component is detected using the signal received by the second antenna.

10. The repeater apparatus of claim 9, wherein the filters further comprise:
a third filter for filtering out the longitudinal wave component from the signal received by the second antenna using the factor generated at the first factor generator; and
a fourth filter for filtering out the transverse wave component from the signal received by the first antenna using the factor generated at the second factor generator,
wherein each of the at least two signal detectors detect a signal with respect to a summation of the transverse wave components output from the first filter and the third filter and detect a signal with respect to a summation of the longitudinal wave components output from the second filter and the fourth filter.

11. The repeater apparatus of claim 10, further comprising:
an amplifier for amplifying a power of the signal detected at each of the signal detectors; and
at least two transmitter antennas, each for transmitting the amplified signals.

12. A method for relaying a signal at a repeater of a wireless communication system, the method comprising:
generating a factor used for removing at least one polarization component other than a select polarization component from signals received on at least two antennas;
filtering out the at least one polarization component other than the select polarization component from the signals received on at least two antennas using the generated factor; and
detecting the signal for the filtered select polarization component
wherein the generating of the factor comprises:
generating the factor used to filter out the longitudinal wave component by orthogonalizing the longitudinal wave component to the transverse wave component when the signal for the transverse wave component is detected using the signal received by a first antenna of the at least two antennas; and
generating the factor used to filter out the transverse wave component by orthogonalizing the transverse wave component to the longitudinal wave component when the signal for the longitudinal wave component is detected using the signal received by a second antenna of the at least two antennas.

13. The method of claim 12, wherein the at least one and select polarization components comprises at least one of a transverse wave and a longitudinal wave.

14. The method of claim 12, wherein the generating of the factor used for removing comprises:
generating the factor using the filtered select polarization component and the detected signal.

15. The method of claim 12, further comprising:
amplifying a power of the detected signal; and
transmitting the amplified signal via at least two transmitter antennas.

16. The method of claim 15, wherein the antennas used for receiving and the transmitter antennas are identical or different antennas.

17. The method of claim 12, wherein the filtering comprises:
filtering out a longitudinal wave component from the signal received by a first of the at least two antennas using the factor when a signal for a transverse wave component is detected using the signal received by the first antenna; and
filtering out a transverse wave component from the signal received by a second of the at least two antennas using another factor when a signal for a longitudinal wave component is detected using the signal received by the second antenna.

18. The method of claim 17, wherein the filtering further comprises:
filtering out the longitudinal wave component from the signal received by the second antenna using the factor; and
filtering out the transverse wave component from the signal received by the first antenna using the factor,
wherein a signal with the transverse wave component is detected with respect to a summation of the transverse wave components in the filtered signals received by the first antenna and the second antennas and a signal with the longitudinal wave component is detected with respect to a summation of the longitudinal components in the filtered signals received by the first antenna and the second antennas.

19. The method of claim 18, further comprising:
amplifying a power of the detected signal; and
transmitting the amplified signal via at least two transmitter antennas.

* * * * *